Patented Jan. 30, 1951

2,540,072

UNITED STATES PATENT OFFICE 2,540,072

PREPARATION OF COPOLYMER OF CHLORO-MALEIC ANHYDRIDE AND BUTADIENE

John T. Hays, Wilmington, Del., assignor to Hercules Powder Company, Wilmington, Del., a corporation of Delaware No Drawing. Application August 19, 1948, Serial No. 45,219

5 Claims. (Cl. 260—78.5)

This invention relates to new copolymers of chloromaleic anhydride and more particularly to soluble copolymers of chloromaleic anhydride and butadiene and to the preparation of these new copolymers.

It is well known that the anhydride of an $\alpha,\beta$-unsaturated-$\alpha,\beta$-dicarboxylic acid, such as chloromaleic acid anhydride, may be condensed according to the Diels-Alder reaction with a conjugated diene, the product of which reaction is a cyclic dicarboxylic acid anhydride. It has also been possible to prepare rubbery copolymers of maleic and fumaric acids and dienes by copolymerizing the acid, or ester thereof, and diene in emulsion.

Now in accordance with this invention it has been found that a chloromaleic anhydride-butadiene copolymer which is soluble in organic solvents may be prepared by copolymerizing chloromaleic anhydride with butadiene in the presence of a peroxide catalyst, the copolymerization being carried out in a ketone solvent.

The following examples illustrate the preparation of these new soluble copolymers. All parts and percentages are by weight unless otherwise indicated.

Example 1

A mixture of 12.25 parts of a purified chloromaleic anhydride, 10 parts of butadiene, 20 parts of acetone and 0.5 part of benzoyl peroxide was heated in a sealed container at 50° C. for 16 hours. The reaction mixture was then dissolved in acetone and any adduct of the chloromaleic anhydride and butadiene which might be present was separated from the chloromaleic-butadiene copolymer by precipitating the copolymer from the acetone solution by adding pertroleum ether. The copolymer so obtained was a white, fibrous material which was readily soluble in acetone and contained 11.3% chlorine. An 0.5% solution of this copolymer in acetone had a relative viscosity of 1.20. The copolymer was soluble in alkali and in organic solvents such as benzene, toluene, acetone and methyl ethyl ketone.

Example 2

Example 1 was repeated except that methyl ethyl ketone was substituted for the acetone used as a solvent in that example. The copolymer so produced had the same solubilities as that of Example 1.

The above examples were repeated under identical conditions except that benzene and toluene were substituted for the ketone solvents used in those examples. In each case the product obtained was insoluble in organic solvents and in alkali. Chlorine analysis on these copolymers (17.6% chlorine) indicated them to be approximately 1:1 copolymers of the chloromaleic anhydride and butadiene.

The copolymers of chloromaleic anhydride and butadiene are unique in that the solubility of the copolymer in organic solvents and in alkali is dependent upon the solvent in which the copolymerization reaction is carried out. This is not the case with copolymers of other $\alpha$-unsaturated-$\alpha,\beta$-dicarboxylic acid anhydride and dienes nor is it even of the copolymers of chloromaleic anhydride and other diolefins. This solubility of the copolymer in organic solvents and in alkali is of particular importance because of its apparent influence on the reactivity of the copolymers. The insoluble chloromaleic-butadiene copolymers are useless for most applications which would utilize the film-forming and plastic properties expected from such a composition and furthermore they are unreactive, not readily undergoing esterification, dehydrochlorination, etc. The soluble chloromaleic-butadiene copolymers are very useful in plastics, protective coatings, etc., and in addition readily undergo all of the characteristic reactions which would be expected of such a copolymer.

The copolymerization of chloromaleic anhydride and butadiene to form soluble copolymers in accordance with this invention is readily carried out by heating the two materials in the presence of a peroxide catalyst and in a ketone solvent. It is not known how the ketone functions to modify the reaction so as to give a soluble product. It may be that it acts as a chain transfer agent resulting in low molecular weight and a reduced tendency toward gelation, or it may be that it acts in some way to inhibit the cross-linking reaction. At any rate, when a ketone is used as the solvent for the reaction, the copolymer is soluble in organic solvents. When the reaction is carried out in an aromatic hydrocarbon solvent such as benzene or toluene which is normally used for such polymerizations, the copolymer is the undesirable insoluble product. In addition to the difference in the solubilities of the products when the reaction is carried out in a ketone solvent or aromatic solvent is the difference in the molecular structure of the two copolymers as evidenced by the chlorine analysis. The soluble copolymer of chloromaleic anhydride and butadiene has a lower chlorine analysis than the usual insoluble 1:1 copolymer and it appears to contain a higher proportion of butadiene.

Any ketone which is a solvent for the reactants may be used as the ketone solvent for the copolymerization in accordance with this invention. The most available ketone solvents are acetone and methyl ethyl ketone. However, other ketones which may be used are diethyl ketone, methyl isopropyl ketone, methyl butyl ketone, ethyl isopropyl ketone, etc. Any desired amount of ketone solvent may be used, but usually from about 1 to about 10 parts of ketone per part of reactants is used and preferably from about 2 to about 4 parts of ketone are used.

The copolymerization of the chloromaleic anhydride and butadiene must also be carried out in the presence of a peroxide catalyst. In the absence of a peroxide catalyst, the crystalline chloromaleic-butadiene adduct is formed. Adduct formation is a competing reaction even in the presence of a peroxide and, although the peroxide causes the polymerization reaction to predominate, a small amount of the low molecular weight crystalline adduct may be formed. This adduct is readily separated from the polymer, as may be seen from the foregoing examples, by dissolving the copolymerization product in acetone, or other ketone, and then adding a low boiling gasoline such as petroleum ether to precipitate the copolymer and leave the adduct in solution. Any organic peroxide capable of furnishing free radicals may be used as the catalyst for the copolymerization reaction. Examples of peroxides which may be used are benzoyl peroxide, acetyl peroxide, ascaridole, lauroyl peroxide, cumene hydroperoxide, etc. The amount of the catalyst used will depend upon the other reaction conditions such as time, temperature, etc. Usually from about 0.005 to about 0.1 mole of peroxide per mole of anhydride is used.

The ratio of chloromaleic anhydride to butadiene used in the preparation of the soluble copolymers of this invention may be varied over a wide range. In general the ratio of chloromaleic anhydride to butadiene may vary from about 1:1 to about 1:10 and preferably is from about 1:1 to about 1:5.

The temperature at which the copolymerization of the chloromaleic anhydride and butadiene in ketone solvent is carried out will depend upon the other reaction conditions as, for example, the ketone used as a solvent, the time, amount of catalyst, etc. Usually a relatively low temperature of about 50° C. is adequate, however, a temperature of from about 25° C. to about 100° C. is operable.

These new copolymers of chloromaleic anhydride and butadiene being soluble in organic solvents and in alkali have many applications. They may be used in synthetic resins, plastics, protective coatings, etc. They are also of value due to their ability to undergo esterification, dehydrohalogenation, etc., whereby many other important derivatives may be formed.

What I claim and desire to protect by Letters Patent is:

1. The process of preparing a soluble copolymer of chloromaleic anhydride and butadiene which comprises copolymerizing chloromaleic anhydride and butadiene in a molar ratio of from about 1:1 to about 1:10 in the presence of a peroxide catalyst and a ketone solvent.

2. The process of preparing a soluble copolymer of chloromaleic anhydride and butadiene which comprises copolymerizing chloromaleic anhydride and butadiene in a molar ratio of from about 1:1 to about 1:5 in the presence of a peroxide catalyst and a ketone solvent.

3. The process of preparing a soluble copolymer of chloromaleic anhydride and butadiene which comprises copolymerizing chloromaleic anhydride and butadiene in a molar ratio of from about 1:1 to about 1:10 in the presence of a peroxide catalyst and acetone.

4. The process of preparing a soluble copolymer of chloromaleic anhydride and butadiene which comprises copolymerizing chloromaleic anhydride and butadiene in a molar ratio of from about 1:1 to about 1:10 in the presence of a peroxide catalyst and methyl ethyl ketone.

5. The product produced by the process of claim 1.

JOHN T. HAYS.

REFERENCES CITED

The following references are of record in the file of this patent:

UNITED STATES PATENTS

| Number | Name | Date |
|---|---|---|
| 2,262,002 | Hopff et al. | Nov. 11, 1941 |
| 2,391,226 | Clifford et al. | Dec. 18, 1945 |
| 2,461,679 | Clifford et al. | Feb. 15, 1949 |

OTHER REFERENCES

Putnam et al., Article in Ind. Eng. Chem. Anal. Ed., vol. 18, pages 628–630, Oct. 1946.